(12) United States Patent
Suzuki et al.

(10) Patent No.: US 11,880,611 B2
(45) Date of Patent: Jan. 23, 2024

(54) DATA PROCESSING APPARATUS, DATA PROCESSING METHOD AND PROGRAM

(71) Applicant: Nippon Telegraph and Telephone Corporation, Tokyo (JP)

(72) Inventors: Takahiro Suzuki, Musashino (JP); Sang-Yuep Kim, Musashino (JP); Junichi Kani, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 136 days.

(21) Appl. No.: 17/618,328

(22) PCT Filed: Jun. 18, 2019

(86) PCT No.: PCT/JP2019/024038
§ 371 (c)(1),
(2) Date: Dec. 10, 2021

(87) PCT Pub. No.: WO2020/255239
PCT Pub. Date: Dec. 24, 2020

(65) Prior Publication Data
US 2022/0229606 A1    Jul. 21, 2022

(51) Int. Cl.
*G06F 3/06* (2006.01)
(52) U.S. Cl.
CPC ............ *G06F 3/0683* (2013.01); *G06F 3/061* (2013.01); *G06F 3/0659* (2013.01)
(58) Field of Classification Search
None
See application file for complete search history.

(56) References Cited

U.S. PATENT DOCUMENTS

| 2008/0235418 A1* | 9/2008 | Werthen ............... H04B 10/807 |
| | | 710/106 |
| 2010/0049905 A1* | 2/2010 | Ouchi .................... G06F 3/0625 |
| | | 713/340 |

(Continued)

FOREIGN PATENT DOCUMENTS

| JP | 2012190206 | 10/2012 |
| JP | 2014229173 | 12/2014 |

(Continued)

OTHER PUBLICATIONS

Kim et al., "Coherent Receiver DSP Implemented on a General-Purpose Server for a Full Software-Defined Access System," IEEE/OSA Journal of Optical Communications and Networking, 2019, 11(1):A96-A102.

(Continued)

*Primary Examiner* — Charles Rones
*Assistant Examiner* — Jonah C Krieger
(74) *Attorney, Agent, or Firm* — Fish & Richardson P.C.

(57) ABSTRACT

A data process device includes a data input unit and a processor. The processor includes a division unit, a first storage unit and a second storage unit which have a plurality of storage areas, a write unit, a calculation unit, and a control unit. The division unit divides a data series input by the data input unit to generate a plurality of divided data. The write unit writes the divided data to the first storage unit according to writing order to the storage areas in the first storage unit. The calculation unit performs calculation processing on the divided data written to the first storage unit, and writes calculated data obtained by the calculation processing to the second storage unit according to writing order to the storage areas in the second storage unit. The control unit controls processing of the write unit and processing of the calculation (Continued)

unit, which are divided into different processing lines, to be executed in parallel by pipeline processing.

6 Claims, 8 Drawing Sheets

(56) References Cited

U.S. PATENT DOCUMENTS

| | | | | |
|---|---|---|---|---|
| 2014/0105266 | A1* | 4/2014 | Xia | H04L 25/03299 375/232 |
| 2014/0358818 | A1* | 12/2014 | Haga | G06F 30/00 705/343 |
| 2017/0192848 | A1* | 7/2017 | Pamies-Juarez | H03M 13/2792 |
| 2022/0197533 | A1* | 6/2022 | Marosan | G06F 13/1668 |

FOREIGN PATENT DOCUMENTS

| | | |
|---|---|---|
| JP | 2017038256 | 2/2017 |
| JP | 2019080190 | 5/2019 |

OTHER PUBLICATIONS

Suzuki et al., "Demonstration of 10-Gbps Real-Time Reed-Solomon Decoding Using GPU Direct Transfer and Kernel Scheduling for Flexible Access Systems," Journal of Lightwave Technology, 2018, 36(10):1875-1881.

* cited by examiner

DATA PROCESSING APPARATUS, DATA PROCESSING METHOD AND PROGRAM

CROSS-REFERENCE TO RELATED APPLICATIONS

This application is a National Stage application under 35 U.S.C. § 371 of International Application No. PCT/JP2019/024038, having an International Filing Date of Jun. 18, 2019. The disclosure of the prior application is considered part of the disclosure of this application, and is incorporated in its entirety into this application.

TECHNICAL FIELD

The present invention relates to data process devices, a data process method and programs.

BACKGROUND ART

In recent years, SDN (software-defined network) and NFV (network functions virtualization) have been actively considered in the network field. These techniques aim to configure data process devices using software and general-purpose processors to improve the flexibility and agility of development of the devices. For this purpose, it is considered to operate some processing of higher functions by software. Further, it is considered to expand a software area including physical layer processing (for example, refer to Non-Patent Literature 1). In order to expand the software area in such a way, it is required to transfer a large amount of data such as a main signal to a processor and perform processing using the transferred data in the processor.

FIG. 8 shows an example where the above technique is utilized mainly for digital signal processing (DSP) of coherent reception. FIG. 8 is a diagram showing a conventional process device for a large amount of data (for example, refer to Non-Patent Literature 2). A main signal is transferred to a GPU (Graphics Processing Unit) via an I/O (input/output) and a CPU (central processing unit). In this case, as a transfer processing from the CPU to the GPU is necessary, the processing takes time in the GPU. Subsequently, in the GPU, DSP calculation is performed on the transferred data, and calculated data is transferred from the GPU to the CPU. The data transferred to the CPU is output as a signal to the outside through the I/O.

CITATION LIST

Non-Patent Literature

Non-Patent Literature 1: Takahiro Suzuki, Sang-Yuep Kim, Jun-ichi Kani, Toshihiro Hanawa, Ken-Ichi Suzuki, and Akihiro Otaka, "Demonstration of 10-Gbps Real-Time Reed-Solomon Decoding Using GPU Direct Transfer and Kernel Scheduling for Flexible Access Systems," Journal of Lightwave Technology, Vol. 36, No. 10, pp. 1875-1881, 2018.

Non-Patent Literature 2: Sang-Yuep Kim, Takahiro Suzuki, Jun-Ichi Kani, and Akihiro Otaka, "Coherent Receiver DSP Implemented on a General-Purpose Server for a Full Software-Defined Access System", IEEE/OSA Journal of Optical Communications and Networking, Vol. 11, No. 1, pp. A96-A102, 2019.

SUMMARY OF THE INVENTION

Technical Problem

In a configuration shown in FIG. 8, transfer and calculation are sequentially executed. Therefore, as the transfer processing becomes larger, time during which the calculation can be performed within constraint time from the input to the output in the GPU decreases. When this configuration is applied to a real-time system which needs to transfer a large amount of data to a processor, it may be difficult to keep total time of the transfer time and the calculation time within the constraint time because the data transfer time is large.

In view of the above circumstances, the present invention aims to provide data process devices, a data process method and programs which make it possible to perform data processing by a processor while reducing processing time required for all of a large amount of data.

Means for Solving the Problem

An aspect of the present invention is a data process device comprising a data input unit which inputs a data series, and a processor which performs predetermined calculation processing using the data series input by the data input unit, wherein the processor comprises a first storage unit which has a plurality of storage areas; a second storage unit which has a plurality of storage areas; a division unit which divides the data series to generate a plurality of divided data; a write unit which writes the divided data to the storage area of the first storage unit according to writing order to the storage areas in the first storage unit; a calculation unit which performs the calculation processing using the divided data written by the write unit, and writes calculated data obtained by the calculation processing to the storage area of the second storage unit according to writing order to the storage areas in the second storage unit; and a control unit which controls processing of the write unit and processing of the calculation unit, which are divided into different processing lines, to be executed in parallel by pipeline processing.

An aspect of the present invention is a data process method comprising a data input step where a data input unit inputs a data series; a division step where a processor divides the data series to generate a plurality of divided data; a write step where the processor writes, according to writing order to a plurality of storage areas included in a first storage unit, the divided data to the storage area of the first storage unit; a calculation step where the processor performs predetermined calculation processing using the divided data written in the write step, and writes, according to writing order to a plurality of storage areas in a second storage unit, calculated data obtained by the calculation processing to the storage area in the second storage unit; and a control step where the processor controls processing of the write step and processing of the calculation step, which are divided into different processing lines, to be executed in parallel by pipeline processing.

An aspect of the present invention is a program for causing a processor to execute a division step of dividing a data series to generate a plurality of divided data; a write step of writing, according to writing order to a plurality of storage areas included in a first storage unit, the divided data to the storage area of the first storage unit; a calculation step of performing predetermined calculation processing using the divided data written in the write step, and writing, according to writing order to a plurality of storage areas in a second storage unit, calculated data obtained by the calculation processing to the storage area in the second storage unit; and a control step of controlling processing of the write step and processing of the calculation step, which are divided into different processing lines, to be executed in parallel by pipeline processing.

An aspect of the present invention is a program for causing a processor to execute a division step of dividing a data series to generate a plurality of divided data, and a control step of controlling another processor which divide a following write process and a following calculation process into different processing lines and execute them, to execute the write process and the calculation process in parallel by pipeline processing: the write process of writing, according to writing order to a plurality of storage areas included in a first storage unit, the divided data to the storage area of the first storage unit; and the calculation process of performing predetermined calculation processing using the divided data written by the write process, and writing, according to writing order to a plurality of storage areas in a second storage unit, calculated data obtained by the calculation processing to the storage area in the second storage unit.

Effects of the Invention

The present invention makes it possible to perform data processing by a processor while reducing processing time required for all of a large amount of data.

DESCRIPTION OF EMBODIMENTS

Hereinafter, embodiments of the present invention are described in detail with reference to the drawings. A data process device according to this embodiment processes in different series transfer processing and calculation processing performed by a processor on received data. When the processor is a GPU, the GPU utilizes different streams to separate and execute the transfer processing and the calculation processing, which were conventionally executed in a sequential manner without separation. The GPU separates the transfer processing and the calculation processing into a plurality of steps and performs pipeline processing, so that the transfer processing and the calculation processing are executed in parallel. Therefore, total calculation time of the transfer processing and the calculation processing for the entire received data is reduced. Accordingly, it is possible to realize a real-time system with time constraints.

When a CPU performs the transfer processing and the calculation processing, the CPU separates the transfer processing and the calculation processing into different processes or different threads, and executes the pipeline processing. In the following, a case where pipeline processing is performed in the GPU is described as an example.

First Embodiment

Figure 1:
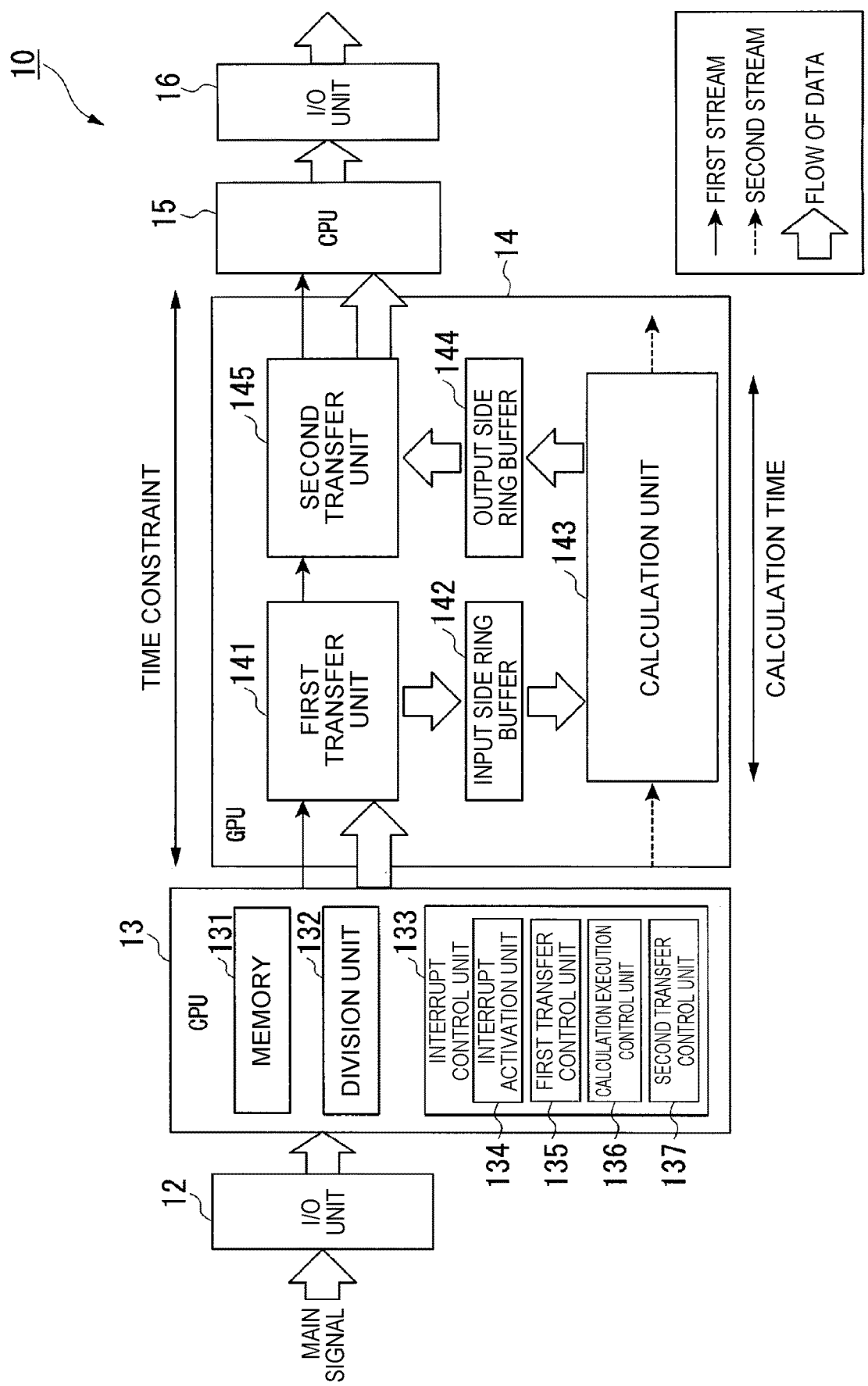
FIG. 1 is a diagram showing a configuration of a data process device according to a first embodiment of the present invention.

FIG. 1 is a diagram showing a configuration of a data process device 10 according to a first embodiment of the present invention. The data process device 10 includes an I/O (input/output) unit 12, a CPU 13, a GPU 14, a CPU 15 and an I/O unit 16. The I/O unit 12 and the I/O unit 16 are, for example, an FPGA (field-programmable gate array) or a network interface card. The CPU 13 and the CPU 15 may be the same CPUs, or may be different CPUs.

The I/O unit 12 inputs/outputs signals between external devices and the CPU 13. The CPU 13 has a memory 131, a division unit 132 and an interrupt control unit 133.

The memory 131 stores data series of signals transferred from the I/O unit 12. The division unit 132 divides the data series stored in the memory 131 into a plurality of data series. The divided data series are described as divided data. The division unit 132 divides the data series in units with which calculation processing in the GPU 14 can be performed without referring to other divided data in the GPU 14. For example, the division unit 132 divides the data series according to a predetermined data length. Alternatively, the division unit 132 detects a range in which the calculation processing can be performed without referring to data in other ranges based on setting contents of the data series, and divides the data series for each detected range.

The interrupt control unit 133 has an interrupt activation unit 134, a first transfer control unit 135, a calculation execution control unit 136 and a second transfer control unit 137. The interrupt activation unit 134 generates a timing for interrupting the GPU 14. For example, the interrupt activation unit 134 periodically activates an interrupt to the GPU 14. The first transfer control unit 135 instructs to the GPU 14 execution of data transfer, a storage location of divided data of a transfer source in the memory 131, and a storage location in the GPU 14 which is a transfer destination of the divided data. The calculation execution control unit 136 instructs execution of the calculation processing activated by a kernel of the GPU 14, a storage location of data to be subject to calculation processing in the GPU 14, and a storage location of calculated data in the GPU 14. The second transfer control unit 137 instructs to the GPU 14 execution of data transfer, the storage location of the calculated data in the GPU 14, and a storage location in the CPU 15 which is a transfer destination of the calculated data.

The GPU 14 has a first transfer unit 141, an input side ring buffer 142, a calculation unit 143, an output side ring buffer 144, and a second transfer unit 145.

The first transfer unit 141 receives an instruction from the first transfer control unit 135 of the CPU 13, reads out divided data from the CPU 13, and writes them to the input side ring buffer 142. The input side ring buffer 142 has a plurality of storage areas. The first transfer control unit 135 of the CPU 13 instructs a storage area of the input side ring buffer 142 in order from a predetermined storage area such as the head, as a storage location of a transfer destination of divided data. After instructing the last storage area of the input side ring buffer 142, the first transfer control unit 135 instructs the head storage area again as a storage location of a transfer destination of divided data.

The calculation unit 143 receives an instruction from the calculation execution control unit 136 of the CPU 13, reads out data to be calculated from the input side ring buffer 142, and performs the instructed calculation processing. At this time, the calculation execution control unit 136 specifies the storage area of the divided data written at the timing of the previous interrupt, as a storage location of the data to be calculated. The calculation unit 143 writes calculated data to the storage area of the output side ring buffer 144 instructed from the calculation execution control unit 136.

The output side ring buffer 144 has a plurality of storage areas. When instructing the calculation unit 143 to execute calculation, the calculation execution control unit 136 of the CPU 13 instructs a storage area of the output side ring buffer 144 in order from a predetermined storage area such as the head, as a storage location of calculated data. After instructing the last storage area of the output side ring buffer 144, the calculation execution control unit 136 instructs the head storage area again as a storage location of calculated data.

The second transfer unit 145 receives an instruction from the second transfer control unit 137 of the CPU 13, reads out calculated data from the output side ring buffer 144, and transfers them to the CPU 15. At this time, the second transfer control unit 137 specifies, as a storage location of the calculated data to be transferred, the storage area of the output side ring buffer 144 where the calculated data was written at the timing of the previous interrupt.

The CPU 15 outputs data transferred from the GPU 14 to the I/O unit 16. The I/O unit 16 transfers the data transferred from the CPU 15 to an external device.

According to the above configuration, a main signal input from the external device to the data process device 10 goes through the I/O unit 12 and the CPU 13, and is divided into divided data, and the divided data are sequentially transferred to the GPU 14. The CPU 13 may perform data processing on the main signal or the divided data before transfer to the GPU 14. The GPU 14 separates and executes, for each divided data, first transfer processing (which is transfer processing from the CPU 13 to the GPU 14) and second transfer processing (which is transfer processing from the GPU 14 to the CPU 15), and calculation processing into a first stream and a second stream which are different streams. The GPU 14 has a plurality of SMs (streaming multiprocessors) and various memories. Each SM has a plurality of cores. One SM performs processing in either the first stream or the second stream. In an SM which performs processing in the second stream, calculation processing is executed in parallel by a plurality of cores. A main signal generated based on the calculated divided data goes through the CPU 15 and the I/O unit 16, and is output to an external device. The CPU 15 may perform data processing on the main signal before transfer to the I/O unit 16.

The GPU 14 may further separate and execute the first transfer processing and the second transfer processing into different streams. In the above description, the data process device which inputs and outputs external signals is described, but a data process device which only inputs external signals or a data process device which only outputs external signals may be used. A data process device which only inputs external signals does not have to have a second transfer unit 145. In the case of a data process device which only outputs external signals, the CPU 13 includes a data input unit which inputs data to be transmitted as an external signal and writes the input data to the memory 131.

Figure 2:
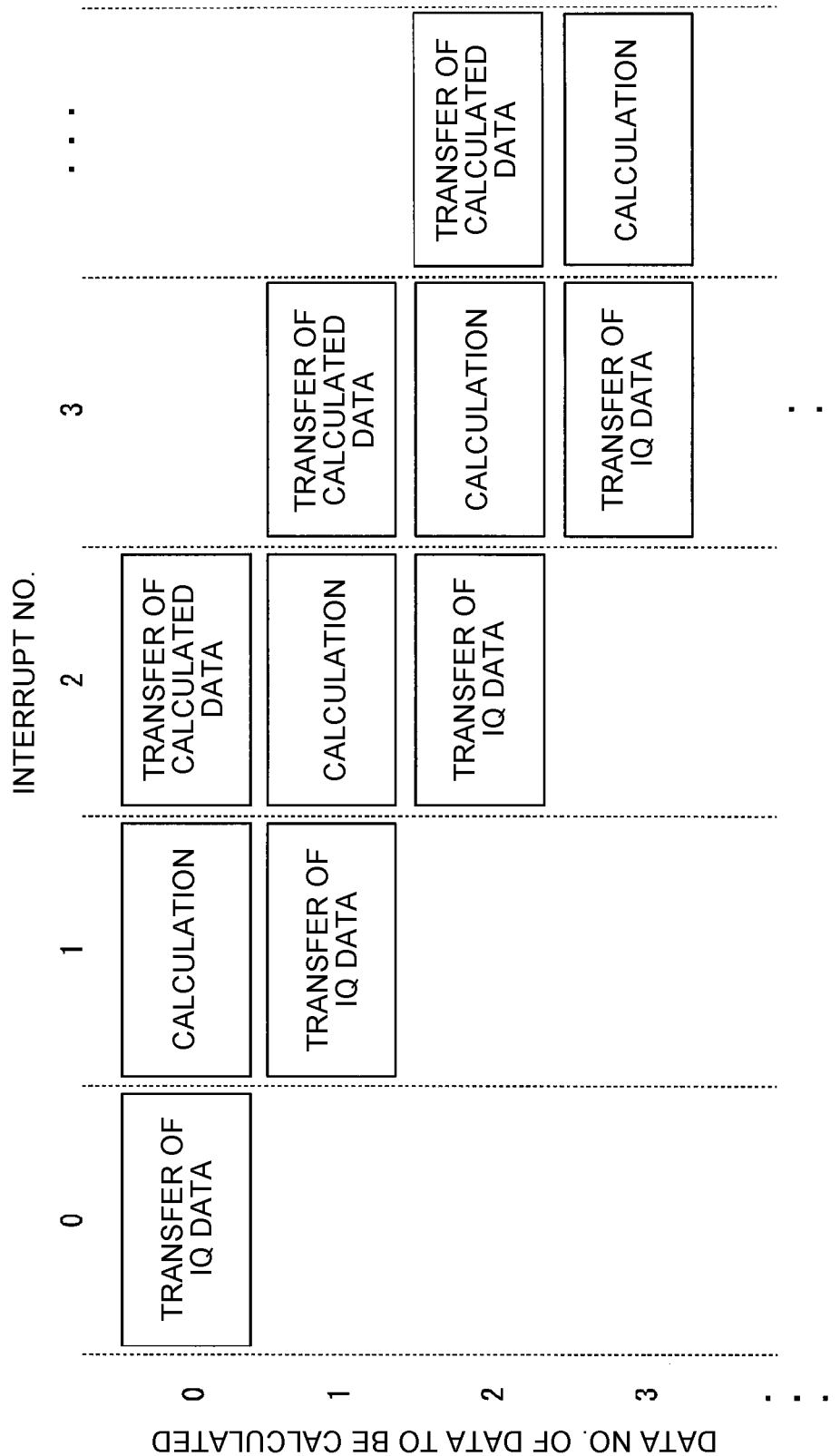
FIG. 2 is a diagram showing an operation example of a GPU according to the same embodiment.

FIG. 2 is a diagram showing an operation example of the GPU 14. FIG. 2 shows an operation example of an instruction pipeline in each interrupt input step assuming digital signal processing of coherent reception. Divided data to be processed is IQ data, and the i-th IQ data ("i" is an integer of 2 or more) is described as IQ data (i). The IQ data includes I data which is an in-phase component (In-Phase component) of a signal and Q data which is data of a quadrature component (Quadrature component) of a signal.

At interrupt No. 0, the GPU 14 transfers IQ data (0) from the CPU 13 by the first transfer processing. At interrupt No. 1, the GPU 14 performs calculation processing on the IQ data (0), and in parallel, transfers the IQ data (1) from the CPU 13 by the first transfer processing. At interrupt No. 2, the GPU 14 outputs calculated data after performing the calculation processing on the IQ data (0) to the CPU 15 by the second transfer processing. Moreover, in parallel, the GPU 14 performs calculation processing on the IQ data (1), and further, in parallel, transfers the IQ data (2) from the CPU 13 by the first transfer processing. By these operations, the data process device 10 executes in a pipeline manner the transfer of the calculated data by the second transfer processing, the calculation processing, and the transfer of IQ data by the first transfer processing.

Figure 3:
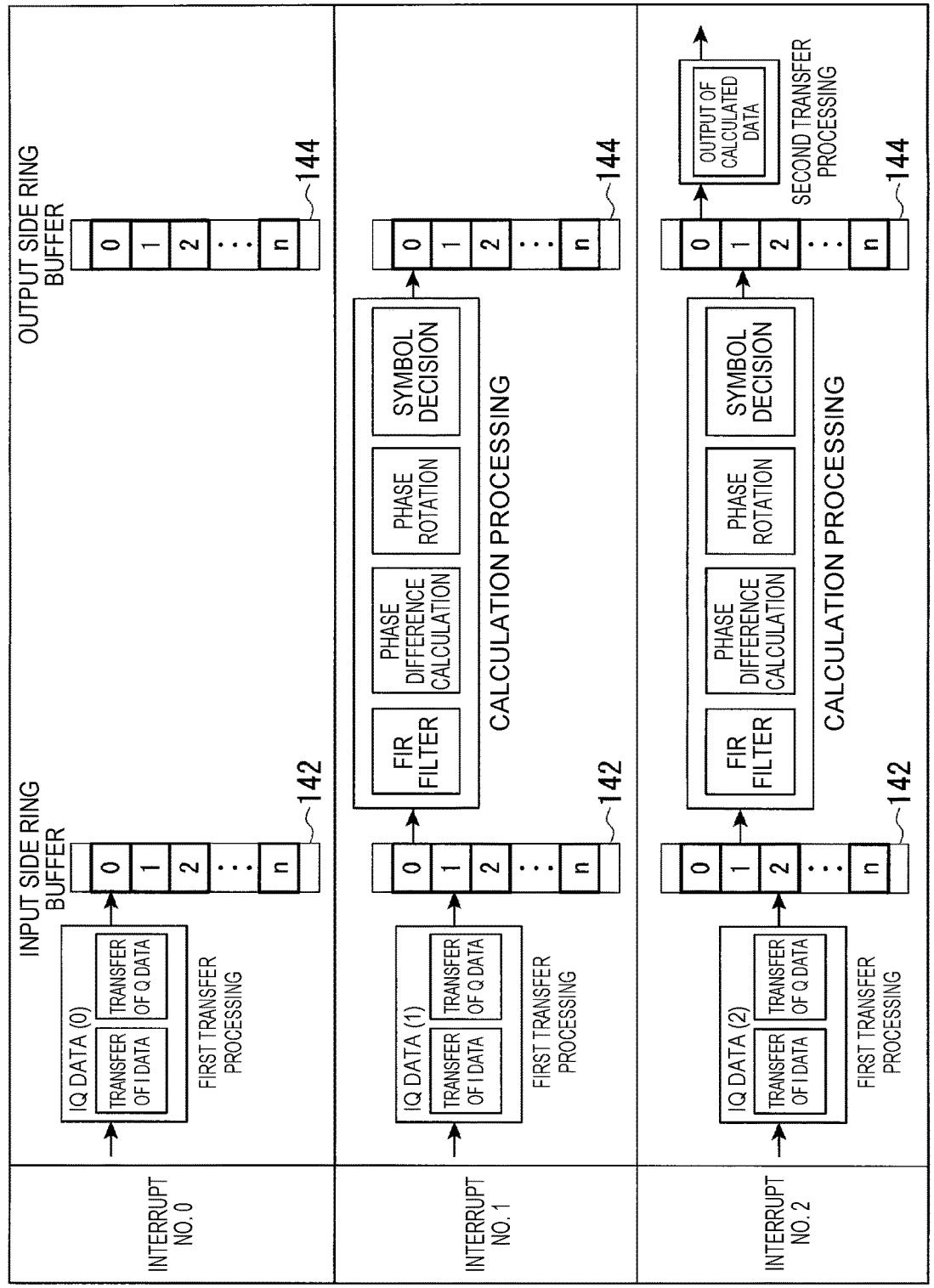
FIG. 3 is a diagram showing pipeline processing in the GPU according to the same embodiment.

FIG. 3 is a diagram showing pipeline processing in the GPU 14. FIG. 3 shows pipeline processing including the input side ring buffer 142 and the output side ring buffer 144 from interrupt No. 0 to interrupt No. 2. N storage areas ("n" is an integer of 2 or more) included in the input side ring buffer 142 are described as the input side ring buffer (n), and n storage areas ("n" is an integer of 2 or more) included in the output side ring buffer 144) are described as the output side ring buffer (n). The calculation processing includes, for example, an FIR filter, phase difference calculation, phase rotation, and symbol decision.

At interrupt No. 0, the first transfer control unit 135 of the CPU 13 instructs to the GPU 14 execution of data transfer, a storage location of IQ data (0) in the memory 131, and an input side ring buffer (0) which is a transfer destination. The first transfer unit 141 of the GPU 14 transfers the IQ data (0) from the instructed storage location of the memory 131 to the input side ring buffer (0).

At interrupt No. 1, the first transfer control unit 135 of the CPU 13 instructs to the GPU 14 execution of data transfer, a storage location of IQ data (1) in the memory 131, and an input side ring buffer (1) which is a transfer destination. The first transfer unit 141 of the GPU 14 transfers the IQ data (1) from the instructed storage location of the memory 131 to the input side ring buffer (1).

Further, at interrupt No. 1, the calculation execution control unit 136 of the CPU 13 instructs to the GPU 14 execution of calculation, the input side ring buffer (0) which is a storage location of data to be calculated, and an output side ring buffer (0) which is a storage location of calculated data. The calculation unit 143 of the GPU 14 performs a calculation processing on the IQ data (0) stored in the input side ring buffer (0), and writes calculated data to the output side ring buffer (0).

At interrupt No. 2, the first transfer control unit 135 of the CPU 13 instructs to the GPU 14 execution of data transfer, a storage location of IQ data (2) in the memory 131, and an input side ring buffer (2) which is a transfer destination. The first transfer unit 141 of the GPU 14 transfers the IQ data (2) from the instructed storage location of the memory 131 to the input side ring buffer (2).

Further, at interrupt No. 2, the calculation execution control unit 136 of the CPU 13 instructs to the GPU 14 execution of calculation, the input side ring buffer (1) which is a storage location of data to be calculated, and an output side ring buffer (1) which is a storage location of calculated data. The calculation unit 143 of the GPU 14 performs a calculation processing on the IQ data (1) stored in the input side ring buffer (1), and writes calculated data to the output side ring buffer (1).

Further, at interrupt No. 2, the second transfer control unit 137 of the CPU 13 instructs to the GPU 14 execution of data transfer, an output side ring buffer (0) where calculated data for IQ data (0) is stored, and a storage location in the CPU 15 which is a transfer destination of the calculated data. The second transfer unit 145 of the GPU 14 reads out the calculated data from the output side ring buffer (0) and transfers them to the instructed storage location of the CPU 15.

As described above, the GPU 14 divides processing performed on one signal into a plurality of stages of processing, and executes the processing divided into the plurality of stages in a plurality of streams. As such, the GPU 14 executes processing for a plurality of divided data in parallel.

Second Embodiment

A data process device according to a second embodiment is used as a communication device. The data process device according to this embodiment has an ADC (analog-to-digital converter) and performs digital signal processing.

Figure 4:
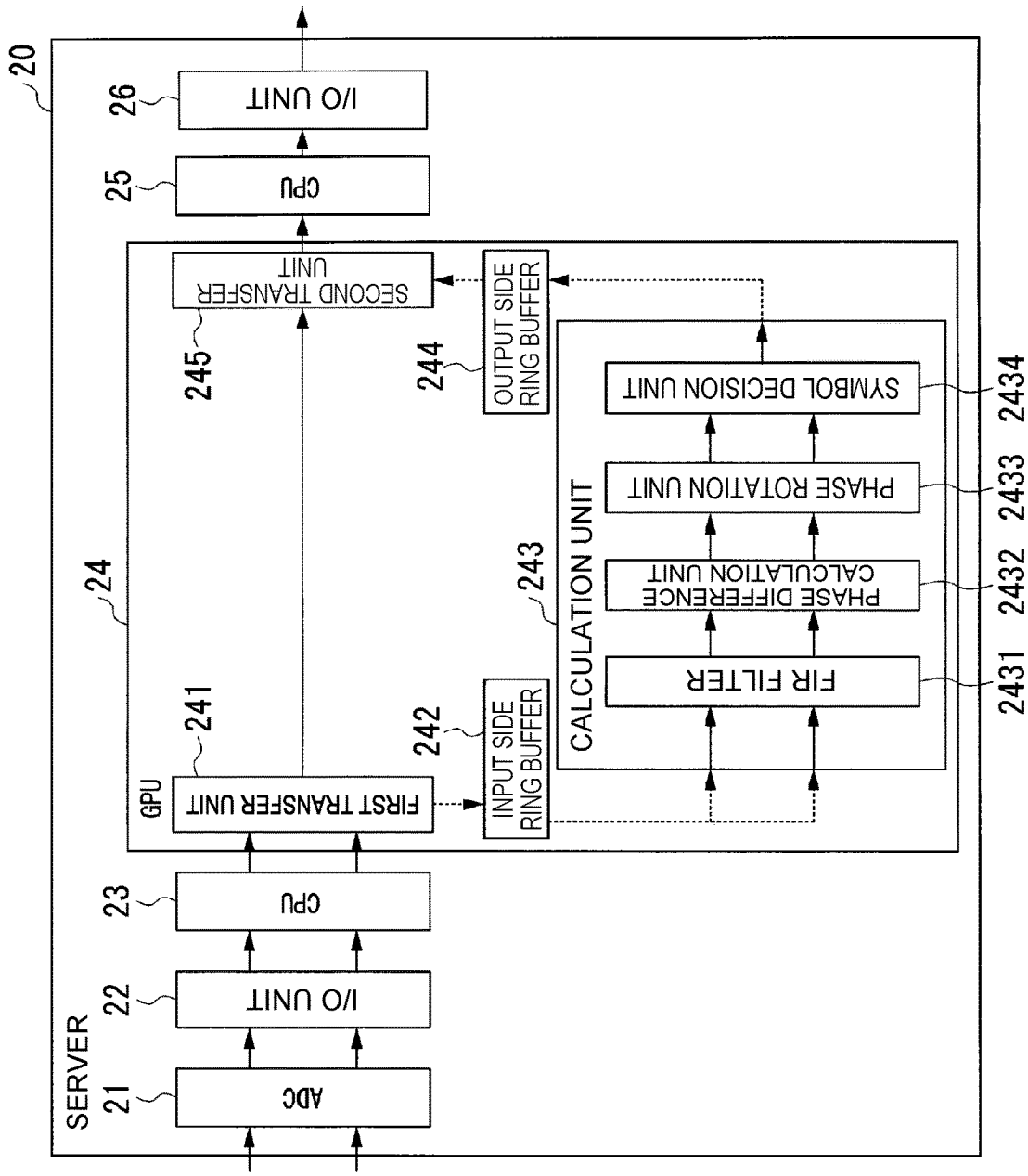
FIG. 4 is a diagram showing a configuration of a server according to a second embodiment.

FIG. 4 is a diagram showing a configuration of a server 20 according to the second embodiment. The server 20 is an example of the data process device. The server 20 includes an ADC 21, an I/O unit 22, a CPU 23, a GPU 24, a CPU 25 and an I/O unit 26. The CPU 23 and the CPU 25 may be the same CPUs, or may be different CPUs.

The ADC 21 converts signals of IQ data received from external devices from analog signals to digital signals and outputs them to the I/O unit 22. The I/O unit 22 inputs/outputs signals between the ADC 21 and the CPU 23. The CPU 23 has functions similar to those of the CPU 13 in the first embodiment. The CPU 23 divides data series of signals received from the I/O unit 22. The CPU 23 interrupts the GPU 24 and instructs the GPU 24 to transfer divided data from the CPU 23 to the GPU 24, execute calculation processing on the divided data, and transfer calculated data to the CPU 25 in parallel by pipeline processing.

The GPU 24 has a first transfer unit 241, an input side ring buffer 242, a calculation unit 243, an output side ring buffer 244 and a second transfer unit 245. The first transfer unit 241, the input side ring buffer 242, the output side ring buffer 244 and the second transfer unit 245 respectively have functions similar to those of the first transfer unit 141, the input side ring buffer 142, the output side ring buffer 144 and the second transfer unit 145 in the first embodiment shown in FIG. 1.

The calculation unit 243 receives an interrupt from the CPU 23, reads out a signal written as divided data in a storage area of the input side ring buffer 242 at the timing of the previous interrupt, and performs digital signal processing. The calculation unit 243 includes an FIR filter 2431, a phase difference calculation unit 2432, a phase rotation unit 2433 and a symbol decision unit 2434. The FIR filter 2431, for each of I data and Q data of a signal stored in the output side ring buffer 244, compensates for waveform deterioration such as wavelength dispersion received by the signal during transmission. The phase difference calculation unit 2432, for each of the I data and the Q data for which the waveform deterioration was compensated for, calculates phase difference with respect to the signal when it is assumed that a phase shift does not occur during transmission. The phase rotation unit 2433, for each of the I data and the Q data for which the waveform deterioration was compensated for, compensates for the phase difference calculated by the phase difference calculation unit 2432. The symbol decision unit 2434 determines a symbol of a QAM (Quadrature Amplitude Modulation) signal based on the I data and the Q data for which the phase difference was compensated for. The symbol decision unit 2434 writes a result of the determination to the output side ring buffer 244.

The CPU 25 outputs data transferred from the second transfer unit 145 of the GPU 24 to the I/O unit 26. The I/O unit 26 transfers the data transferred from the CPU 25 to an external device.

According to the above configuration, a main signal input to the server 20 is transferred to the GPU 24 via the ADC 21, the I/O unit 22 and the CPU 23. The GPU 24 executes digital signal processing such as an FIR filter, phase difference calculation, phase rotation and symbol decision in calculation processing. Data calculated by the digital signal processing is output to the outside via the CPU 25 and the I/O unit 26.

When the GPU sequentially performs transfer processing and calculation processing, the sum of time required for the transfer processing and time required for the calculation processing needs to satisfy a time constraint in a real-time system. However, since high throughput data transfer is required in a communication system, the transfer processing becomes large. As the transfer processing becomes large, it becomes difficult to satisfy the time constraint. The server 20 shown in FIG. 4 performs parallel processing by separating the transfer processing by the first transfer unit 241 and the second transfer unit 245, and the calculation processing by the calculation unit 243 into different streams. Since the transfer processing and the calculation processing independently satisfy the time constraint, the server 20 can realize the real-time processing.

Figure 5:
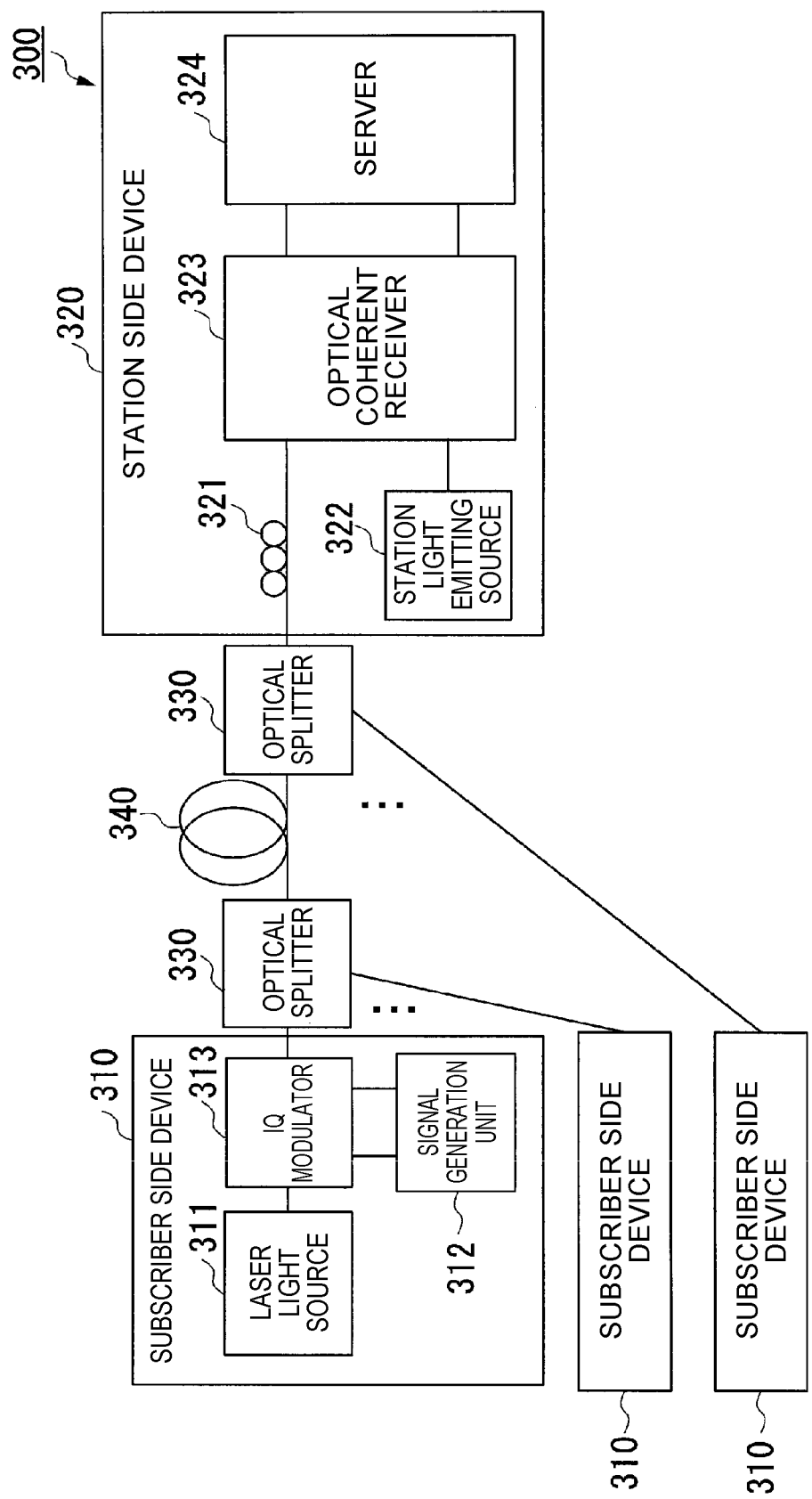
FIG. 5 is a diagram showing a configuration of an optical access network system according to the same embodiment.

FIG. 5 is a diagram showing a configuration of an optical access network system 300 using the server 20 shown in FIG. 4. The optical access network system 300 has a subscriber side device 310 and a station side device 320. The station side device 320 is connected to one or more subscriber side devices 310 via an optical splitter 330 and an optical fiber 340.

The subscriber side device 310 includes a laser light source 311, a signal generation unit 312 and an IQ modulator 313. The laser light source 311 generates laser light. The signal generation unit 312 generates a transmission signal and outputs the generated transmission signal to the IQ modulator 313. The IQ modulator 313 transmits an IQ signal generated by modulating the laser light to the station side device 320 by the transmission signal. The optical splitter 330 multiplexes IQ signals transmitted from a plurality of subscriber side devices 310 and outputs them in the direction of the station side device 320.

The station side device 320 has a polarization controller 321, a station light emitting source 322, an optical coherent receiver 323, and a server 324. The polarization controller 321 changes polarization states of the IQ signals received from the subscriber side devices 310. The station light emitting source 322 generates local light. The optical coherent receiver 323 makes the local light generated by the station light emitting source 322 interfere by a 90-degree optical hybrid with the IQ signals whose polarization states were changed by the polarization controller 321 to extract I data and Q data. The optical coherent receiver 323 outputs IQ data including the extracted I data and Q data to the server 324. As the server 324, the server 20 shown in FIG.

4 is used. The server 324 performs digital signal processing on the received IQ data. When performing the digital signal processing, the calculation unit 243 of the GPU 24 included in the server 324 performs each processing of the FIR filter 2431, the phase difference calculation unit 2432 and the phase rotation unit 2433 in parallel for each of the I data and the Q data. The symbol decision unit 2434 determines a symbol using a result of phase rotation processing performed by the phase rotation unit 2433 for each of the I data and the Q data.

Third Embodiment

A data process device according to a third embodiment is used as a communication device. The data process device according to this embodiment has a PD (photodiode) and performs encoding (decode) and decoding (encode) processing.

Figure 6:
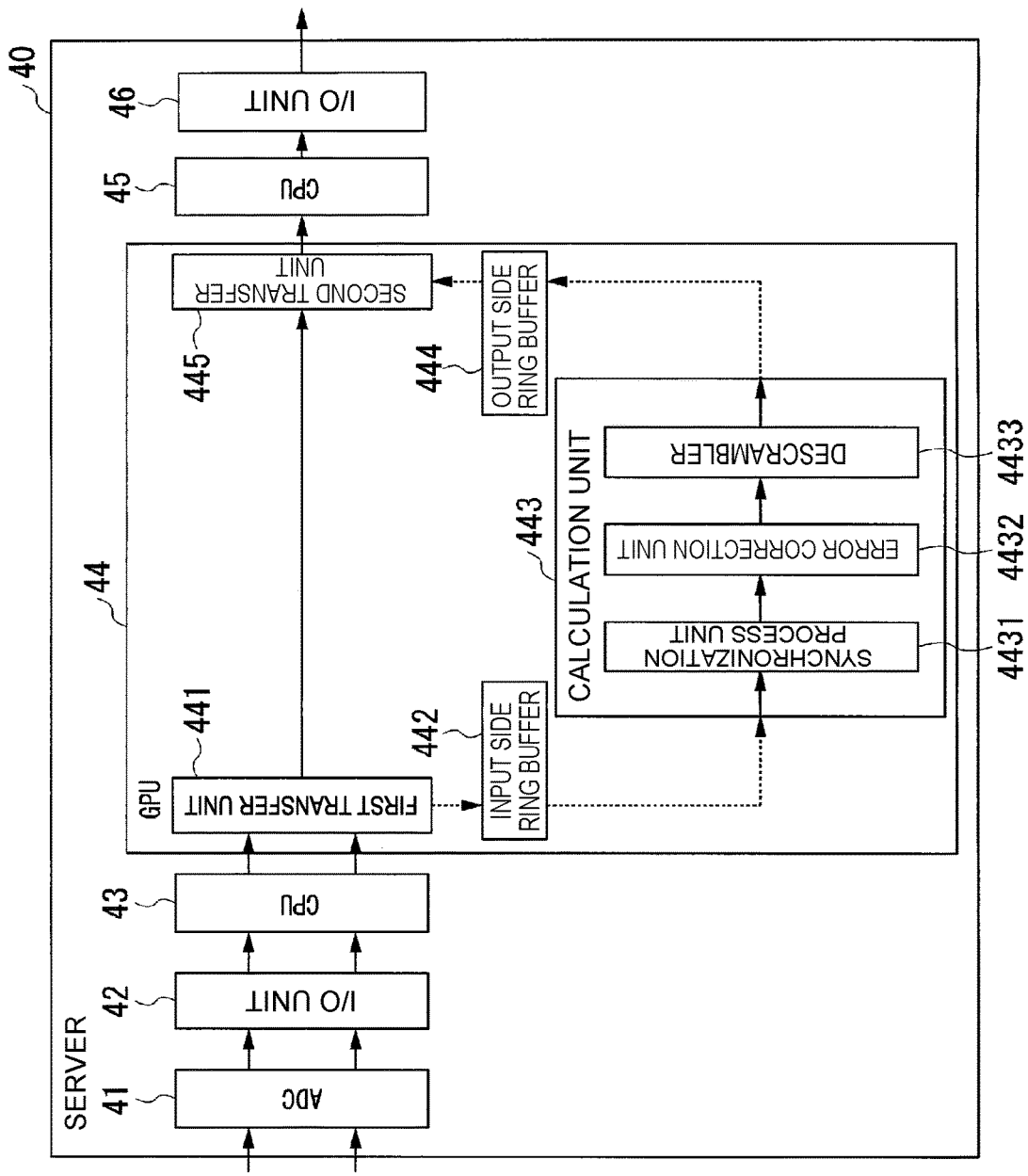
FIG. 6 is a diagram showing a configuration of a server according to a third embodiment.

FIG. 6 is a diagram showing a configuration of a server 40 according to the third embodiment. The server 40 is an example of the data process device. The server 40 includes a PD 41, an I/O (input/output) unit 42, a CPU 43, a GPU 44, a CPU 45 and an I/O unit 46. The CPU 43 and the CPU 45 may be the same CPUs, or may be different CPUs.

The PD 41 converts a received optical signal into an analog electric signal and outputs it to the I/O unit 42. The I/O unit 42 inputs/outputs signals between the PD 41 and the CPU 43. The CPU 43 has functions similar to those of the CPU 13 in the first embodiment. The CPU 43 divides data series of signals received from the I/O unit 42. The CPU 43 interrupts the GPU 44 and instructs to transfer divided data from the CPU 43 to the GPU 44, execute calculation processing on the divided data, and transfer calculated data to the CPU 45 in parallel by pipeline processing.

The GPU 44 has a first transfer unit 441, an input side ring buffer 442, a calculation unit 443, an output side ring buffer 444 and a second transfer unit 445. The first transfer unit 441, the input side ring buffer 442, the output side ring buffer 444 and the second transfer unit 445 respectively have functions similar to those of the first transfer unit 141, the input side ring buffer 142, the output side ring buffer 144 and the second transfer unit 145 in the first embodiment shown in FIG. 1.

The calculation unit 443 receives an interrupt from the CPU 43, reads out data of a signal written as divided data in a storage area of the input side ring buffer 442 at the timing of the previous interrupt, and performs decoding processing. The calculation unit 443 has a synchronization process unit 4431, an error correction unit 4432 and a descrambler 4433. The synchronization process unit 4431 performs frame synchronization and detects the head of a frame of the signal. The error correction unit 4432 performs error correction decoding on the frame of which the head was detected. The descrambler 4433 performs descrambling processing on the frame on which error correction decoding was performed. The descrambler 4433 writes a result of the descrambling processing to the output side ring buffer 444.

The CPU 45 outputs data transferred from the second transfer unit 445 of the GPU 44 to the I/O unit 46. The I/O unit 46 transfers the data transferred from the CPU 45 to an external device.

According to the above configuration, a main signal input to the server 40 is transferred to the GPU 44 via the PD 41, the I/O unit 42 and the CPU 43. The GPU 44 executes decoding processing such as frame synchronization, error correction decoding and descrambling processing in calculation processing. Data calculated by the decoding processing is output to the outside via the CPU 45 and the I/O unit 46.

Here, decoding processing is shown as an example, but the GPU 44 may execute encoding processing. When the GPU sequentially performs transfer processing and calculation processing, the sum of time required for the transfer processing and time required for the calculation processing needs to satisfy a time constraint in a real-time system. However, since high throughput data transfer is required in a communication system, the transfer processing becomes large. As the transfer processing becomes large, it becomes difficult to satisfy the time constraint. The server 40 shown in FIG. 6 performs parallel processing by separating the transfer processing by the first transfer unit 441 and the second transfer unit 445, and the calculation processing by the calculation unit 443 into different streams. Since the transfer processing and the calculation processing independently satisfy the time constraint, the server 40 can realize the real-time processing.

Figure 7:
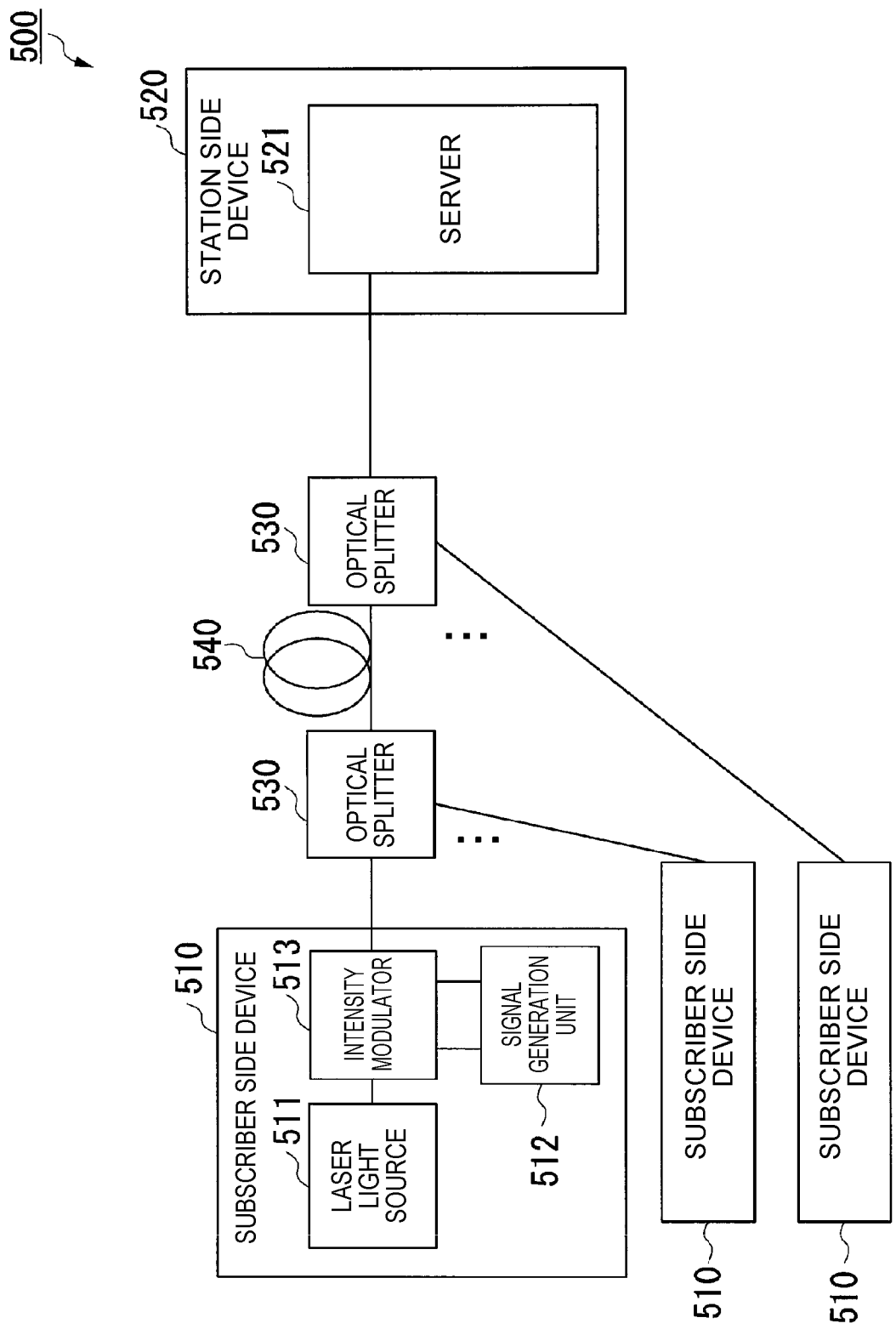
FIG. 7 is a diagram showing a configuration of an optical access network system according to the same embodiment.
Figure 8:
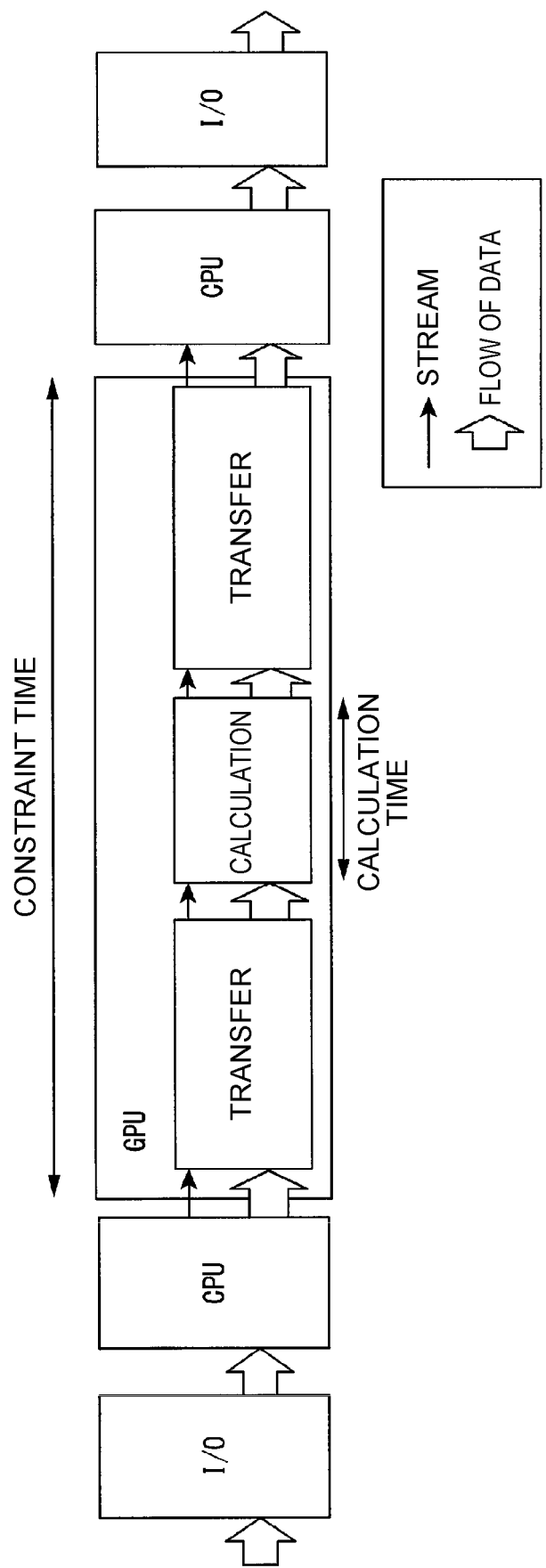
FIG. 8 is a diagram showing a process device for a large amount of data according to a prior art.

FIG. 7 is a diagram showing a configuration of an optical access network system 500 using the server 40 shown in FIG. 6. The optical access network system 500 has a subscriber side device 510 and a station side device 520. The station side device 520 is connected to one or more subscriber side devices 510 via an optical splitter 530 and an optical fiber 540.

The subscriber side device 510 includes a laser light source 511, a signal generation unit 512 and an intensity modulator 513. The laser light source 511 generates laser light. The signal generation unit 512 generates a transmission signal and outputs the generated transmission signal to the intensity modulator 513. The intensity modulator 513 transmits an optical signal generated by modulating intensity of the laser light to the station side device 520 by the transmission signal. The optical splitter 530 multiplexes optical signals transmitted from a plurality of subscriber side devices 510 and outputs them in the direction of the station side device 520.

The station side device 520 has a server 521. As the server 521, the server 40 shown in FIG. 6 is used. The server 521 decodes the optical signal received from the subscriber side device 510.

The data process devices according to the embodiments described above divide data series into a plurality of data series, divide transfer processing of transferring the divided data series to a memory and calculation processing on the data series stored in the memory into steps, and process each in different processing lines. This enables pipeline processing in a plurality of steps in the data process device. Therefore, total time of the transfer processing and the calculation processing for the entire data series in the data process device is reduced, and it is possible to realize a real-time system with time constraints.

The CPU 13 and the GPU 14 of the data process device 10, the CPU 23 and the GPU 24 of the server 20, and the CPU 43 and the GPU 44 of the server 40 perform the above operations by executing compiled programs. Some or all of these programs may be recorded on recording media included in the data process device 10, the server 20 and the server 40.

When the data process device 10, the server 20 and the server 40 do not use the GPUs, the CPUs included in the data process device 10, the server 20 and the server 40 perform the first transfer processing and the second transfer processing, and the calculation processing, or each of the first transfer processing, the second transfer processing and the calculation processing in different processes or different threads to execute pipeline processing. In that case, the CPUs in the data process device 10, the server 20 and the server 40 may realize this function by reading out and executing the programs recorded on the recording media.

According to the embodiments described above, the data process device includes a data input unit and a processor. The data input unit inputs a data series to be subject to calculation processing. For example, the data input units are the I/O units 12, 22 and 42. The processor performs predetermined calculation processing using the data series input by the data input unit. For example, the processors are the CPU 13 and the GPU 14, the CPU 23 and the GPU 24, and the CPU 43 and the GPU 44. Alternatively, for example, the processors are the CPUs included in the data process device 10, the server 20 and the server 40.

The processor includes a first storage unit, a second storage unit, a division unit, a write unit, a calculation unit and a control unit. The first storage unit and the second storage unit respectively have a plurality of storage areas. For example, the first storage units are the input side ring buffers 142, 242 and 442, and the second storage units are the output side ring buffers 144, 244 and 444. The division unit divides the data series input by the data input unit to generate a plurality of divided data. For example, the division unit is the division unit 132. The write unit writes, for each divided data, the divided data to the storage area of the first storage unit according to writing order to the storage areas in the first storage unit. For example, the write units are the first transfer units 141, 241 and 441. The calculation unit performs, for each divided data written by the write unit, calculation processing using the divided data, and writes calculated data obtained by this calculation processing to the storage area of the second storage unit according to writing order to the storage areas in the second storage unit. For example, the calculation units are the calculation units 143, 243 and 443. The control unit controls processing of the write unit and processing of the calculation unit, which are divided into different processing lines and activated at the timing of each interrupt, to be executed in parallel by pipeline processing. For example, the control unit is the interrupt control unit 133. For example, the processing line is a stream in the GPU, or a thread or a process in the CPU.

The data process device may further include an output unit which outputs the calculated data to the outside. In this case, the processor further includes a transfer unit which, for each of the calculated data written by the calculation unit, reads out the calculated data from the second storage unit and transfers it to the output unit. For example, the output unit is the I/O unit 16, and the transfer unit is the second transfer unit 145. In the processor, processing of the write unit and processing of the transfer unit, and processing of the calculation unit are divided into different processing lines. Alternatively, the processing of the write unit, the processing of the calculation unit, and the processing of the transfer unit are divided into different processing lines. The control unit controls the processing of the write unit, the processing of the calculation unit, and the processing of the transfer unit, which are activated at the timing of each interrupt, to be executed in parallel by pipeline processing.

The data process device may have a first processor which is a central processing unit, and a second processor which is an accelerator, as processors. For example, the first processor is the CPUs 13, 23 and 43, and the second processor is the GPUs 14, 24 and 44. The first processor has a division unit and a control unit, and the second processor has a first storage unit, a second storage unit, a write unit, a calculation unit and a transfer unit.

The data process device may further include a conversion unit which converts an analog signal into a digital signal. For example, the conversion unit is the ADC 21. The data input unit inputs the digital signal obtained through conversion by the conversion unit as a data series. The calculation unit performs digital signal processing as calculation processing.

The data process device may further include a conversion unit which converts an optical signal into an electrical signal. For example, the conversion unit is the PD 41. The data input unit inputs the electrical signal obtained through conversion by the conversion unit as a data series. The calculation unit performs encoding processing or decoding processing as calculation processing.

Although the embodiments of the present invention have been described above in detail with reference to the drawings, the specific configuration is not limited to these embodiments, and includes designs and the like within a range which does not depart from the substance of the present invention.

REFERENCE SIGNS LIST

10 Data process device
12, 16, 22, 26, 42, 46 I/O unit
13, 15, 23, 25, 43, 45 CPU
14, 24, 44 GPU
20, 40, 324, 521 Server
21 Analog-to-digital converter
41 PD
131 Memory
132 Division unit
133 Interrupt control unit
134 Interrupt activation unit
135 First transfer control unit
136 Calculation execution control unit
137 Second transfer control unit
141, 241, 441 First transfer unit
142, 242, 442 Input side ring buffer
143, 243, 443 Calculation unit
144, 244, 444 Output side ring buffer
145, 245, 445 Second transfer unit
300, 500 Optical access network system
310, 510 Subscriber side device
311, 511 Laser light source
312, 512 Signal generation unit
313 IQ modulator
320 Station side device
321 Polarization controller
322 Station light emitting source
330, 530 Optical splitter
340, 540 Optical fiber
323 Optical coherent receiver
513 Intensity modulator
2431 FIR filter
2432 Phase difference calculation unit
2433 Phase rotation unit
2434 symbol decision unit
4431 Synchronization process unit
4432 Error correction unit
4433 Descrambler

The invention claimed is:

1. A data processing device comprising one or more processors configured to perform operations comprising:
   receiving a data series, and dividing the data series into a plurality of divided data;

writing a first divided data into a first storage unit according to a first writing order;

performing, in parallel, (i) a predetermined calculation in a first processing line using the first divided data written into the first storage unit to obtain a calculated data, and (ii) a writing operation of writing a second divided data into the first storage unit according to the first writing order of the first storage unit in a second processing line; and writing the calculated data obtained by the predetermined calculation into a second storage unit according to a second writing order of the second storage unit.

2. The data processing device according to claim 1, wherein the operations further comprise:

reading out the calculated data from the second storage unit and transferring the calculated data for output, wherein the transferring of the calculated data, calculation of the second divided data, and writing of a third divided data are executed in parallel.

3. The data processing device according to claim 1, wherein the operations further comprise:

converting an analog signal into a digital signal, wherein the digital signal is obtained through conversion as the data series, the predetermined calculation comprises digital signal processing.

4. The data processing device according to claim 1, wherein the operations further comprise:

converting an optical signal into an electrical signal, inputting the electrical signal obtained through conversion as the data series, the predetermined calculation comprises encoding processing or decoding processing.

5. A data processing method comprising inputting a data series;

dividing the data series into a plurality of divided data;

writing, according to a first writing order, a first divided data into a first storage unit;

performing, in parallel, (i) a predetermined calculation in a first processing line using the first divided data written into the first storage unit to obtain a calculated data, and (ii) a writing operation of writing a second divided data into the first storage unit according to the first writing order of the first storage unit in a second processing line; and writing, according to a second writing order of a second storage unit, the calculated data obtained by the predetermined calculation into in the second storage unit.

6. A program recorded on a recording medium for causing a processor to execute:

dividing a data series into a plurality of divided data;

writing, according to a first writing order, a first divided data into a first storage unit;

performing, in parallel, (i) a predetermined calculation in a first processing line using the first divided data written into the first storage unit to obtain a calculated data, and (ii) a writing operation of writing a second divided data into the first storage unit according to the first writing order of the first storage unit in a second processing line; and writing, according to a second writing order of a second storage unit, the calculated data obtained by the predetermined calculation into the second storage unit.

* * * * *